United States Patent [19]

Guzi, Jr.

[11] 4,056,402

[45] Nov. 1, 1977

[54] DRY WATER-DISPERSIBLE PIGMENT COMPOSITIONS

[75] Inventor: John Guzi, Jr., Argyle, N.Y.

[73] Assignee: Hercules Incorporated, Wilmington, Del.

[21] Appl. No.: 717,415

[22] Filed: Aug. 24, 1976

[51] Int. Cl.$^2$ .............................. C08L 1/26; C09C 3/08
[52] U.S. Cl. .............................. 106/308 Q; 106/193 J; 106/193 P; 106/193 D
[58] Field of Search ............ 106/308 Q, 193 J, 193 P, 106/193 D, 308 M

[56] References Cited

U.S. PATENT DOCUMENTS

| | | | |
|---|---|---|---|
| 3,093,603 | 7/1963 | Gilchrist | 106/193 J |
| 3,458,804 | 7/1969 | Wolf et al. | 106/309 |
| 3,652,313 | 3/1972 | Nagata et al. | 106/193 J |
| 3,843,380 | 10/1974 | Beyn | 106/309 |
| 3,844,806 | 10/1974 | Wegmann et al. | 106/308 Q |

Primary Examiner—Patrick P. Garvin
Assistant Examiner—J. V. Howard
Attorney, Agent, or Firm—Hazel L. Deming

[57] ABSTRACT

Dry, non-dusting pigment compositions which are water-dispersible and which develop good strength and color values upon stirring in water-borne industrial finish systems are described. The pigment compositions contain 55 to 80% pigment and, by weight of the pigment, from 15 to 45% of certain nonionic dispersing agents and from 10 to 67% of at least one water-soluble cellulose ether which is nonionic in nature and has a viscosity of less than 1000 cps. as measured on a 2% aqueous solution at 25° C. The pigment compositions are preferably prepared by milling the pigment in water in the presence of the nonionic dispersing agent, mixing the milled pigment dispersion with the cellulose ether and then removing the water from the resulting mixture.

10 Claims, No Drawings

DRY WATER-DISPERSIBLE PIGMENT COMPOSITIONS

This invention relates to dry pigment compositions in water-dispersible form and more particularly to dry pigment compositions which are non-dusting and which develop upon stirring in water-borne industrial finish systems, strength and color values which are at least equal to the values obtained by milling conventional dry pigments in similar systems.

Water-borne coating systems wherein the volatile portion of the system is essentially water have been commercially available for many years as trade-sale, latex type paints. Water-borne coating systems, however, have only recently been developed for industrial type finishes, due primarily to the processing difficulties encountered in meeting the high performance characteristics achieved with organic solvent-borne coating systems. Water-borne industrial finish systems differ from latex type paints in several respects, the most important of which concerns the nature and type of resins used as the base component. In industrial finish systems, the base comprises water-soluble or water-dispersible resins which must be insolubilized by curing or crosslinking to give the hardness, durability, and water and solvent resistance required of industrial finishes. On the other hand, latex paints are primarily designed for interior and exterior home applications and are emulsions or solutions of filmforming polymers which, upon removal of the water-containing vehicle by drying in air, give unitary films by coalescence of the polymer particles. Hardness and solvent resistance are not required for home applications and are not provided by latex paints. Inasmuch as water offers great potential as a substantially pollution-free carrier medium, the use of water-borne coating systems for industrial finishes is particularly desirable from the standpoint of reducing pollution, fire hazards and employee hazards.

Water-borne systems are generally classified as emulsions, colloidal dispersions or solutions depending upon the particle size, molecular weight and ionic content of the polymer or resin base. Emulsion systems are usually opaque, contain high molecular weight polymers, generally in the range of 1 million, with few functional groups, have a particle size range of about 0.1 to about 1.0 micron and require emulsifying agents to maintain system stability. Dispersions normally refer to translucent mixtures wherein the diameter of the resin particles range from about 0.01 to about 0.1 micron and the resins have a molecular weight of about 10,000 to about 100,000 and more functional groups than the high molecular weight polymers. Hence, dispersions have a higher polarity than emulsions and auxiliary dispersants are not usually required to maintain stability. The solution systems refer to clear homogeneous mixtures containing low molecular weight, water-soluble resins which generally contain ionizable amine or carboxylic acid groups which solubilize the molecules. The water-soluble resins have a molecular weight of about 1,000 to about 10,000 and the particle size approaches molecular magnitudes, generally near 0.001 micron. The presence of functional groups, even though most are reacted during curing, generally affects the water resistance of the final finish so that the water resistance is poorest with the solution systems, highest with the emulsion systems and intermediate thereto with the dispersion systems.

At some stage in the formulation of water-borne coating systems, it is conventional to introduce a coloring amount of one or more pigments. The type and degree of processing necessary to provide uniformly colored formulations usually involves milling the ingredients under conditions of shear, and the major problem encountered in formulating water-borne systems is foaming during processing. While processing the pigment in the binder or polymer prior to the addition of water reduces the foaming problem to some extent and allows reasonable ease of dispersion, milling of the pigment is still required to develop good strength and color values.

In the past, various methods have been proposed to overcome the difficulties of uniformly incorporating pigments in paints. For example, in U.S. Pat. No. 3,067,053 to Tarantino (Dec. 4, 1962) there is described a method for coating pigment particles in presscake form with from 4 to 65% by weight of the pigment of a nonionic surface-active agent (with or without an anionic surface-active agent) to improve the ease of dispersion and produce colorants of outstanding strength and color value. Slurries or pastes of these colorants are easily dispersed in latex systems by a simple mixing or stirring operation and do not need to be milled to develop stable color values. However, when such slurries or pastes are dried and powdered, ease of dispersibility, rate of color development and strength in latex systems are considerably reduced over their non-dried counterparts and dry colorants do not develop optimum strength and color values on stirring in water-borne industrial finish systems.

Tarantino also suggests using certain thickeners such as sodium carboxymethyl cellulose in amounts from about 0.8 to about 6% by weight of the dry pigment to control the viscosity of the pastes or slurries. Such thickeners are said to have no effect on the final tinctorial intensity of the pigment composition but if a dry product is to be obtained, the thickener should be limited to pigmentary or cellulosic materials which are easily wettable, or dispersible after drying. Tarantino's dry pigment compositions containing up to 7% of a colloid-type thickener likewise do not develop optimum strength and color values on stirring in water-borne industrial finish systems.

Nagata et al. in U.S. Pat. No. 3,652,313 (Mar. 28, 1972) teach improving the dispersibility of pigments in latex paints by mixing the pigment with greater than 5% and preferably from 10 to 30% by weight of the pigment of a water-soluble hydroxyalkyl cellulose having a viscosity below 300 cps. and disclose that the pigment dispersions also show good redispersibility after drying. Nagata et al.'s dried dispersions, likewise, do not develop the full color value of their non-dried counterparts. Dry, non-dusting pigment compositions which are easily dispersed in water-borne, industrial finish systems and which develop on stirring good strength and color qualities are not produced according to the Nagata et al. patent.

Additionally, Beyn, in U.S. Pat. No. 3,843,380 (Oct. 22, 1974), teaches producing free-flowing and dustless mineral pigment aggregates by spray-drying an aqueous pigment slurry containing 0.1–5% by weight of the pigment of a colloid-type thickener such as, for example, hydroxypropylmethyl cellulose. Beyn also discloses that 0.1–2% of a water-soluble or dispersible nonionic surfactant and/or 0.2–1% of a dispersing assistant such as a lower molecular weight glycol can also be present in the pigment slurry. The spray dried aggregates of Beyn are not readily dispersible in water-borne industrial finish systems and require milling to achieve good strength and color development.

Now in accordance with the present invention, it has been found that dry, water-dispersible pigment compositions having broad compatibility in water-borne industrial finish systems can be produced and that such dry compositions are non-dusting and develop on stirring in such systems strength and color values which are at least equivalent to the values achieved by milling dry pigment in similar systems. Additionally, the cured finishes produced using water-borne industrial systems colored with the pigment compositions of this invention exhibit excellent gloss, hardness and durability, are water and solvent resistant and meet the other high performance characteristics demanded of industrial finishes.

Accordingly, the present invention relates to a process for preparing a dry, non-dusting, water-dispersible pigment composition having the above properties, said process comprising the steps of: forming a homogeneous mixture consisting essentially of milled or homogenized pigment, water, at least one nonionic dispersing agent of the polyether alcohol type, the alkylene oxide-alkylene diamine block polymer type or the polyoxyethylene glycol or glycerol ester type and at least one water-soluble, nonionic cellulose ether having a viscosity of less than 1000 cps. as measured on a 2% aqueous solution at 25° C.; and removing the water from said mixture until a dry composition is obtained, the amount of pigment, dispersing agent and cellulose ether being such as to provide a dry composition consisting essentially of from 55 to 80% of pigment and, based on the pigment weight, from 15 to 45% of dispersing agent and 10 to 67% of cellulose ether. The present invention also relates to the pigment compositions so produced.

The compositions of the invention are dry concentrates wherein the amount of pigment ranges from 55 to 80% by weight of the composition and the remainder, i.e., 45 to 20% of the composition, consists essentially of at least one nonionic dispersing agent of the polyester alcohol type, the alkylene oxide-alkylene diamine block polymer type or polyoxyethylene glycol or glycerol ester type, and at least one water-soluble, nonionic cellulose ether having a viscosity less than 1000 cps, as measured on a 2% aqueous solution at 25° C., the amount of dispersing agent being 15 to 45% by weight of the pigment and the amount of cellulose ether being 10 to 67% by weight of the pigment. Preferably, the compositions are concentrates containing 60–75% and most preferably 60–70% of pigment.

The invention can be practiced with the inorganic and organic prime pigments, extender pigments, metallic pigments, the various finely-divided channel and furnace blacks and the like. Typical pigments include organic pigments such as the diarylide yellows, the phthalocyanine blues and greens, the quinacridone reds and violets, dioxazine violet and the like; and inorganic pigments such as the cadium reds and yellows, the molybdate oranges, iron oxide yellows and reds, and the like. Also suitable are the hydrophilic type pigments such as, for example, titanium dioxide and the lead chromate colors.

As stated above, the use of a certain type of nonionic dispersing agent in an amount ranging from 15 to 45% by weight of the pigment is necessary to the practice of this invention. The dispersing agents which have been found to be useful in this invention are of the types known as polyether alcohols, alkylene oxide-alkylene diamine block polymers, polyoxyethylene glycol esters and polyoxyethylene glycerol esters, and generally have an HLB greater than 11 and preferably from about 12 to about 18. The term HLB refers to the hydrophilic-lipophilic balance of the surfactant and is reported as a number. A number of 0 to about 10 describes an oil-dispersible surfactant and a number from about 10 to 20 describes a water-dispersible surfactant. Preferred nonionic dispersing agents of the polyether alcohol type are the condensates of ethylene oxide and an alcohol component such as a rosin alcohol or an alkyl phenol, condensates of propylene oxide with an alcohol component such as propylene glycol, and the like. Particularly preferred are the alkylaryl polyether alcohols which contain an average of 7 to 40 moles of ethylene oxide per mole of alcohol and contain alkyl groups of 7 to 10 carbon atoms. The polyether alcohol type dispersing agents are commercially availabe as the Tritons, e.g., X-100, X-102, N-101 and N-111 of Rohm and Haas Co., the Igepals of General Aniline & Film Corp., the Hyonics of Nopco Chemical Co., the Tergitols of Union Carbide Corp. and the Pluronics of BASF Wyandotte Corp. Typical of the alkylene oxide-amine block polymer type dispersing agents are the materials formed by the addition of an alkylene oxide to an alkylene diamine, as for example by the addition of propylene oxide to ethylene diamine followed by the addition of ethylene oxide. Dispersing agents of this type are commercially available as the Tetronics of BASF Wyandotte Corp. Nonionic dispersing agents of the polyoxyethylene glycol or glycerol ester type include the ethoxylated fatty and rosin acid esters such as the polyethylene glycol fatty and/or rosin acid esters and the polyoxyethylene fatty glycerides containing at least 10 moles of ethylene oxide per mole of such acids as coconut fatty acid, stearic acid, oleic acid and rosin/fatty acid combinations. Dispersing agents of this type are commercially available as the Ethofats of Armour Industrial Chemical Co. and Atlas G-1295 and G-1300 of I.C.I. America, Inc.

The amount of nonionic dispersing agent will, as stated, fall within the range of 15 to 45% by weight of the pigment and sufficient dispersing agent must be present to provide ease of processing and particle size reduction. Usually, an amount between about 15 and 35% by weight of the pigment will provide good dispersibility without detriment to any other desirable properties.

The practice of the invention also requires the presence of at least one water-soluble, nonionic cellulose ether. The function of the cellulose ether is multiphase since it acts synergistically with the dispersing agent to reduce the pigment particle size beyond that which can be accomplished by the dispersing agent alone, acts as a coating for the pigment particles to prevent reagglomeration during the drying process, acts to prevent flocculation and provides broad compatibility in a broad variety of industrial finish systems. The amount of the water-soluble cellulose ether will range from 10 to 67%, and preferably from 15 to 40% by weight of the pigment.

The cellulose ethers which are useful in the practice of the present invention are any of the water-soluble cellulose ethers which are nonionic in nature and have a viscosity of less than 1000 cps., and preferably from about 5 cps. to about 600 cps., as measured on a 2% aqueous solution at 25° C. The preferred cellulose ethers are alkyl celluloses such as methyl cellulose having a D.S. (degree of substitution) of about 1.2 to about 2.1, ethyl cellulose having a D.S. of about 1.0 to about 1.5, methyl ethyl cellulose having a methyl D.S. of about 0.5 to about 1.0 and an ethyl D.S. of about 0.2 to about 0.5, and isopropyl cellulose having a D.S. of about 0.5; the hydroxyalkyl celluloses such as hydroxyethyl cellulose having an M.S. (molar substitution) of at least about 1.0 and hydroxypropyl cellulose having an M.S. of at least about 1.0; and the alkyl hydroxyalkyl celluloses such as hydroxypropyl methyl cellulose having a methoxyl D.S. of about 0.8 to about 2.0 and a hydroxypropyl M.S. of about 0.5 to about 0.5 and ethyl hydroxyethyl cellulose having an ethoxyl D.S. of about 0.5 to about 2.0 and a hydroxyethyl M.S. of about 0.5 to about 2.0. Particularly preferred cellulose ethers are methyl cellulose having a D.S. of about 1.4 to about 2.1 and a viscosity of about 10 to about 500 cps.; hydroxyethyl cellulose having an M.S. of from about 1.5 to about 3 and a viscosity less than 600 cps.; hydroxypropyl cellulose having an M.S. of about 2 to about 10 and a viscosity less than 300 cps.; hydroxypropyl methyl cellulose having a methoxyl D.S. of about 1.1 to about 1.8, a hydroxypropyl M.S. of about 0.07 to about 0.2 and a viscosity less than about 500 cps.; ethyl hydroxyethyl cellulose having an ethoxyl D.S. of about 0.6 to about 1.3, a hydroxyethyl M.S. of about 0.2 to about 1.1 and a viscosity of less than about 500 cps.; and methyl hydroxyethyl cellulose having a methoxyl D.S. of about 1.6 to about 1.9, a hydroxyethyl M.S. of about 0.13 and a viscosity of less than about 500 cps. The abbreviations D.S. and M.S. are defined in U.S. Pat. No. 3,278,521 to Klug (Oct. 11, 1966). D.S. represents the average number of hydroxyl groups substituted in the cellulose per anhydroglucose unit and M.S. represents the average number of molecules of reactant combined with each anhydroglucose unit of cellulose.

Water-soluble cellulose ethers of the above types are well known and generally available, as for example, the methyl celluloses available commercially as the Methocel A brand of Dow Chemical Co., the hydroxyethyl celluloses available commercially as the Natrosol hydroxyethyl celluloses of Hercules Incorporated, the hydroxypropyl celluloses available as the Klucel hydroxypropyl celluloses of Hercules Incorporated, and the hydroxypropyl methyl celluloses available as Methocel E, F and K brands of Dow Chemical Co.

Other nonionic materials in small amounts can also be present providing, of course, that they do not detract from the advantages of the invention. Particularly useful are materials such as wetting agents, antifoaming agents, etc., in amounts up to about 3% by weight of the pigment.

As stated, the process of the invention comprises, in brief, the steps of forming a specific homogeneous mixture, and then drying the mixture. The first step can be carried out in one or more stages. If one stage is used, all of the ingredients, i.e., the pigment, dispersing agent, cellulose ether, and water are milled or homogenized conventionally as, for example, in a pebble mill or a Gaulin homogenizer until a homogeneous mixture is formed. If two stages are employed, and such is generally preferred from the standpoint of economics, an aqueous dispersion of the pigment is first produced by milling or homogenizing the pigment in water in the presence of the nonionic dispersing agent, the pigment preferably being in presscake form and then the pigment dispersion so produced is intimately mixed in a second stage with the desired amount of the cellulose ether. The mixing of the second stage can be carried out in any known manner for mixing solids and liquids and is suitably carried out by stirring and then homogenizing. The final step of the process is dehydration wherein the water is removed until a dry composition is obtained. Preferably the water is removed by spray drying which gives a finely-divided, dustless product directly. Alternatively, the water can be removed by tray drying and the dried product cryogenically ground to produce a product in powdery form.

The invention is further illustrated by the following examples wherein all parts and percentages are by weight unless otherwise indicated. The viscosity values for the cellulose ethers are the viscosities in cps. as measured on a 2% aqueous solution at 25° C. unless specified otherwise.

EXAMPLE 1

262 parts of a copper phthalocyanine blue presscake containing 65 parts of pigment (dry weight), 16.25 parts of an isooctyl phenyl polyethoxyethanol dispersing agent, and 40 parts of water were added to a stainless steel tank equipped with an agitator and the tank contents were stirred for 30 minutes at 25° C. until deflocculation had occured. The deflocculated pigment was next passed twice through a homogenizer, following which the aqueous dispersion so produced was agitated for 30 minutes with 0.3 part of an antifoaming agent, 30 parts of water and 18.75 parts of hydroxypropyl cellulose having an M.S. of 3 and a Brookfield viscosity of 6 to 7 cps. (Klucel type E). The resulting mixture was passed once through the homogenizer and homogenized mixture was then air dried at 60° C. for 30 hours. The dried product was mixed with dry ice in the weight ratio of about 10/1 and the mixture was micro-pulverized through a 1/16 inch screen. The resulting product was a dry, non-dusting, particulate concentrate containing 65% of pigment, 16.25% of the dispersing agent and 18.75% of the hydroxypropyl cellulose.

The dry pigment concentrate of this example was evaluated as a stirrable color for a typical industrial, crosslinkable, water-reducible paint vehicle containing acrylic and melamine resins (75:25 weight ratio), organic solvents, amine stabilizers and water. In this evaluation a test paint was formed by gently stirring 4.46 parts of the dry concentrate of this example in 22.3 parts of water for 10 minutes, adding the resulting dispersion to 116.5 parts of the paint vehicle, stirring to mix the dispersion uniformly into the paint vehicle, adding 103 parts of a white mill base to the resulting paint and stirring for an additional 10 minutes. The white mill base which was added to the paint was formulated by pebble milling 55 parts of titanium dioxide with 48 parts of the paint vehicle for 72 hours and then separating the resulting white mill base from the pebbles. The test paint of this example had a pigment to binder ratio of 57.9 to 61.6 and a #4 Ford cup viscosity of 16 seconds, and gave a Hegman paint guage reading of 7. The paint was sprayed onto primed steel panels in three separate applications to provide a total coating thickness of 1.5 mils and the coated panels were then prebaked in an oven at 93° C. for 5 minutes followed by baking at 163° C. for 15 minutes. The resulting panels had a smooth, glossy blue surface. Exposure in a Cleveland humidity cabinet for 48 hours at 60° C. did not alter the surface characteristics of the panels.

The above evaluation was repeated using a control paint formed by pebble milling 2.9 parts of copper phthalocyanine blue (the dried form of the copper phthalocyanine blue presscake used in this example) with 119.6 parts of the paint vehicle for 65 hours and, when foaming had subsided, stirring 103 parts of the white mill base and 20.8 parts of deionized water therein for 30 minutes. The resulting control paint had a pigment:binder ratio of 57.9:61.6 and a #4 Ford cup viscosity of 18.5 seconds and gave a Hegman paint gauge reading of 7¼. The panels coated with the control paint had a smooth, glossy surface which was not altered by the Cleveland humidity test. A visual comparison of the panels coated with the test and control paints showed that the test paint (prepared from the pigment concentrate of this example) gave a cleaner, greener color which was more than 20% stronger than the control paint.

When the procedure of this example was repeated except that 18.75 parts of isooctyl phenyl polyethoxyethanol were substituted for the 18.75 parts of hydroxypropyl cellulose, the resulting dried product (containing 65% of pigment and 35% of the dispersing agent) was a sticky, globular mass in a commercially unacceptable physical form.

When the procedure of this example was repeated except that 16.25 parts of hydroxypropyl cellulose and 450 parts of water were substituted for the 16.25 parts of the isooctyl phenyl polyethoxyethanol and 40 parts of water, the resulting product (containing 65% of pigment and 35% of the hydroxypropyl cellulose) was a dry, dusty concentrate. Evaluation of this concentrate as a stirrable color according to the above procedure gave coated panels having a color strength which was at least 15% reduced as compared with the panels coated with the paint formulated with the pigment concentrate of this example.

When the procedure of this example was repeated except that 1.9 parts of isooctyl phenyl polyethoxyethanol and 900 parts of water were substituted for the 16.25 parts of isooctyl phenyl polyethoxyethanol and 40 parts of water, and 4.7 parts of hydroxypropyl cellulose and 700 parts of water were substituted for the 18.75 parts of hydroxypropyl cellulose and 30 parts of water, the resulting product was a dry, dusty concentrate containing 93.4% of pigment, 1.9% of the dispersing agent and 4.7% of the hydroxypropyl cellulose. Evaluation of this concentrate as a stirrable color for industrial paints according to the above procedure gave a paint in which no color developed, indicating that the pigment concentrate was not dispersible with stirring.

EXAMPLE 2

The procedure of Example 1 was repeated except that 375 parts of a 5% aqueous solution of hydroxyethyl cellulose having a D.S. of 2.5 and a Brookfield viscosity of 12 to 15 cps. (Natrosol 250 type L) was substituted for the 18.75 parts of hydroxypropyl cellulose. The resulting product was a dry, non-dusting, redispersible concentrate containing 65% pigment, 16.25% of the dispersing agent and 18.75% of the hydroxyethyl cellulose. When the product was evaluated according to the procedure of Example 1, the test paint had a #4 Ford cup viscosity of 15.5 seconds and gave a Hegman gauge reading of 6½. The coated panels possessed a smooth, glossy surface which showed no change after 48 hours at 60° C. in the Cleveland humidity cabinet. The test paint from the pigment concentrate of this example gave a cleaner, greener and 10–20% stronger color than the control paint of Example 1.

EXAMPLE 3

The procedure of Example 2 was repeated except that powdered hydroxypropyl methyl cellulose having a methoxy D.S. of 1.36 to 1.42, a hydroxypropyl M.S. of 0.18 to 0.23 and a 2% viscosity at 20° C. of 80–120 cps. (Methocel K) was substituted for the hydroxyethyl cellulose of Example 2. The resulting product was a dry, non-dusting, redispersible concentrate containing 65% pigment. When the product was evaluated according to the procedure of Example 1, the test paint had a #4 Ford cup viscosity of 18 seconds and gave a Hegman gauge reading of 6½. The panel surfaces were comparable to those of Example 2. The test paint from the pigment concentrate of this example gave a cleaner and 10–20% stronger color than the control paint of Example 1.

EXAMPLE 4

226 Parts of manganese 2B Red presscake containing 69 parts of pigment (dry weight), 17.25 parts of an isooctyl phenyl polyethoxyethanol dispersing agent and 87 parts of water were added to a stainless steel tank equipped with an agitator and the tank contents were stirred for 30 minutes at 25° C. until deflocculation had occurred. The deflocculated pigment was next passed through a homogenizer, following which the aqueous dispersion so produced was agitated for 30 minutes with 0.3 part of an antifoaming agent and 13.75 parts of the hydroxypropyl cellulose of Example 1. The resulting mixture was passed once through the homogenizer and the homogenized mixture was then air dried at 60° C. for 24 hours. The dried product was mixed with dry ice in the weight ratio of about 10/1 and the mixture was micropulverized through a 1/16 inch screen. The resulting product was a dry, non-dusting concentrate containing 69% of pigment, 17.25% of the dispersing agent and 13.75% of the hydroxypropyl cellulose.

When the concentrate was evaluated according to the procedure of Example 1, the test paint had a #4 Ford cup viscosity of 20.0 seconds and gave a Hegman gauge reading of 6¾. The panels coated with the test paint had a smooth, glossy, red surface.

A control paint was formulated according to the procedure used for the control of Example 1 except that manganese 2B Red (the dried form of the presscake used in this example) was substituted for copper phthalocyanine blue and milling was carried out for 80 hours. The control paint had a #4 Ford cup viscosity of 20.8 seconds and gave a Hegman gauge reading of 7. A visual comparison of the panels coated with the test and control paints showed that the test paint (prepared from the pigment concentrate of this example) gave a much cleaner, much bluer color which was more than 10% stronger than the color of the control paint. Following exposure of the test and control panels for 48 hours in the Cleveland humidity cabinet, the exposed portion of the control panel was slightly lighter in shade than the exposed portion of the test panel.

What I claim and desire to protect by Letters Patent is:

1. A dry, non-dusting, water-dispersible pigment composition developing upon stirring in water-borne industrial finish systems good strength and color values, said composition consisting essentially of from 55 to 80% of pigment and, based on the pigment weight, from 15 to 45% of a nonionic dispersing agent of the polyether alcohol type, alkylene oxide-alkylene diamine block polymer type or polyoxyethylene glycol or glycerol ester type and from 10 to 67% of at least one water-soluble, nonionic cellulose ether having a viscosity of less than 1000 cps. as measured on a 2% aqueous solution at 25° C.

2. The composition of claim 1 wherein the cellulose ether is hydroxyethyl cellulose having a viscosity less than 600 cps.

3. The composition of claim 1 wherein the cellulose ether is hydroxypropyl cellulose having a viscosity less than 300 cps.

4. The composition of claim 3 wherein the dispersing agent is a polyether alcohol.

5. The composition of claim 4 wherein the pigment is present in an amount ranging from 60 to 70% by weight of the composition.

6. A process for preparing a dry, non-dusting, water-dispersible pigment composition developing upon stirring in water-borne industrial finish systems good strength and color values, said process consisting essentially of the steps of: forming a homogeneous mixture consisting essentially of milled or homogenized pigment, water, a nonionic dispersing agent of the polyether alcohol type, the alkylene oxide-alkylene diamine block polymer type or the polyoxyethylene glycol or glycerol ester type and at least one water-soluble, nonionic cellulose ether having a viscosity of less than 1000 cps. as measured on a 2% aqueous solution at 25° C.; and removing the water from said mixture until a dry composition is obtained, the amount of pigment, dispersing agent and cellulose ether being such as to provide a dry composition consisting essentially of from 55 to 80% of pigment, and, based on the pigment weight from 15 to 45% of the dispersing agent and 10 to 67% of the cellulose ether.

7. The process of claim 6 wherein the step of forming the homogeneous mixture comprises: milling or homogenizing the pigment in water in the presence of the nonionic dispersing agent to form an aqueous pigment dispersion; and mixing said pigment dispersion with the cellulose ether until a homogeneous mixture is formed.

8. The process of claim 7 wherein the water is removed by spray drying the mixture.

9. The process of claim 8 wherein the cellulose ether is hydroxyethyl cellulose having a viscosity of less than 600 cps.

10. The process of claim 8 wherein the cellulose ether is hydroxypropyl cellulose having a viscosity of less than 300 cps.

* * * * *